United States Patent
Saito (10) Patent No.: US 6,373,844 B1
(45) Date of Patent: Apr. 16, 2002

(54) ATM SYSTEM WITH ABR FUNCTION

(75) Inventor: Takashi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/181,661

(22) Filed: Oct. 29, 1998

(30) Foreign Application Priority Data

Oct. 31, 1997 (JP) .............................................. 9-314568

(51) Int. Cl.[7] .......................... H04L 12/28; H04L 12/56
(52) U.S. Cl. ............................... 370/395.1; 370/236.1; 370/253
(58) Field of Search .............................. 370/395.1, 397, 370/399, 463, 409, 465, 229, 230, 231, 232, 233, 234, 235, 236, 216, 242, 252, 253, 389, 236.1, 395.43

(56) References Cited

U.S. PATENT DOCUMENTS

| | | | |
|---|---|---|---|
| 5,153,578 A | | 10/1992 | Izawa et al. |
| 5,222,108 A | | 6/1993 | Suzuki |
| 5,237,565 A | | 8/1993 | Henrion et al. |
| 5,754,530 A | * | 5/1998 | Awdeh et al. ................ 370/232 |
| 5,889,761 A | * | 3/1999 | Yamato ....................... 370/231 |
| 5,923,645 A | * | 7/1999 | Okuda et al. ................ 370/232 |
| 5,966,381 A | * | 10/1999 | Buckley et al. ............. 370/395 |
| 5,991,268 A | * | 11/1999 | Awdeh et al. ................ 370/232 |
| 6,046,983 A | * | 4/2000 | Hasegawa et al. .......... 370/232 |
| 6,052,361 A | * | 4/2000 | Ansari et al. ................ 370/232 |

FOREIGN PATENT DOCUMENTS

| | | |
|---|---|---|
| JP | 4-263542 | 9/1992 |
| JP | 6-252938 | 9/1993 |
| JP | 07283813 A | 10/1995 |

OTHER PUBLICATIONS

Japanese Office Action, dated Jan. 5, 1999, with English language translation of Japanese Examiner's comments.
Kawahara, R., et al., "Simulation Analysis of Virtual Source/Virtual Destination Performance," *Proceedings of the 1997 Communications Society Conference of IEICE*, Sep. 3–6, 1997, pp. 1–2.

* cited by examiner

Primary Examiner—Dang Ton
Assistant Examiner—Brian Nguyen
(74) Attorney, Agent, or Firm—Whitham, Curtis & Christofferson P.C.

(57) ABSTRACT

An ATM system with ABR function is disclosed, that comprises a VS/VD. The VS/VD informs a downstream segment portion of a CCR area of a BRM cell folded back in an upstream segment. The downstream segment portion compares an ER area of the BRM cell with the CCR area. When the value of the CCR area is smaller than the value of the ER area, the downstream segment portion updates the ER area with the value of the CCR area.

12 Claims, 6 Drawing Sheets

FIG. 5B (DATA CELL) INFORMATION CELL

GFC(4) .. GENERIC FLOW CONTROL
VPI(8) .. VIRTUAL PATH IDENTIFIER
VCI(16) .. VIRTUAL CHANNEL IDENTIFIER
PTI(3) .. PAYLOAD TYPE INDICATOR
CLP(1) .. CELL LOSS PRIORITY
HEC(8) .. HEADER ERROR CONTROL

FIG. 5C (RM CELL)DATA (47*8)

FIG. 5D (MESSAGE FIELD)

ATM SYSTEM WITH ABR FUNCTION

BACKGROUND OF THE INVENTION

1. Field of the Invention

The present invention relates to ATM (Asynchronous Transfer Mode), in particular, to an ATM system with ABR (Available Bit Rate) function for optimally using a network resource and a method for deciding a transmission rate of ATM cells.

2. Description of the Related Art

Figure 1:
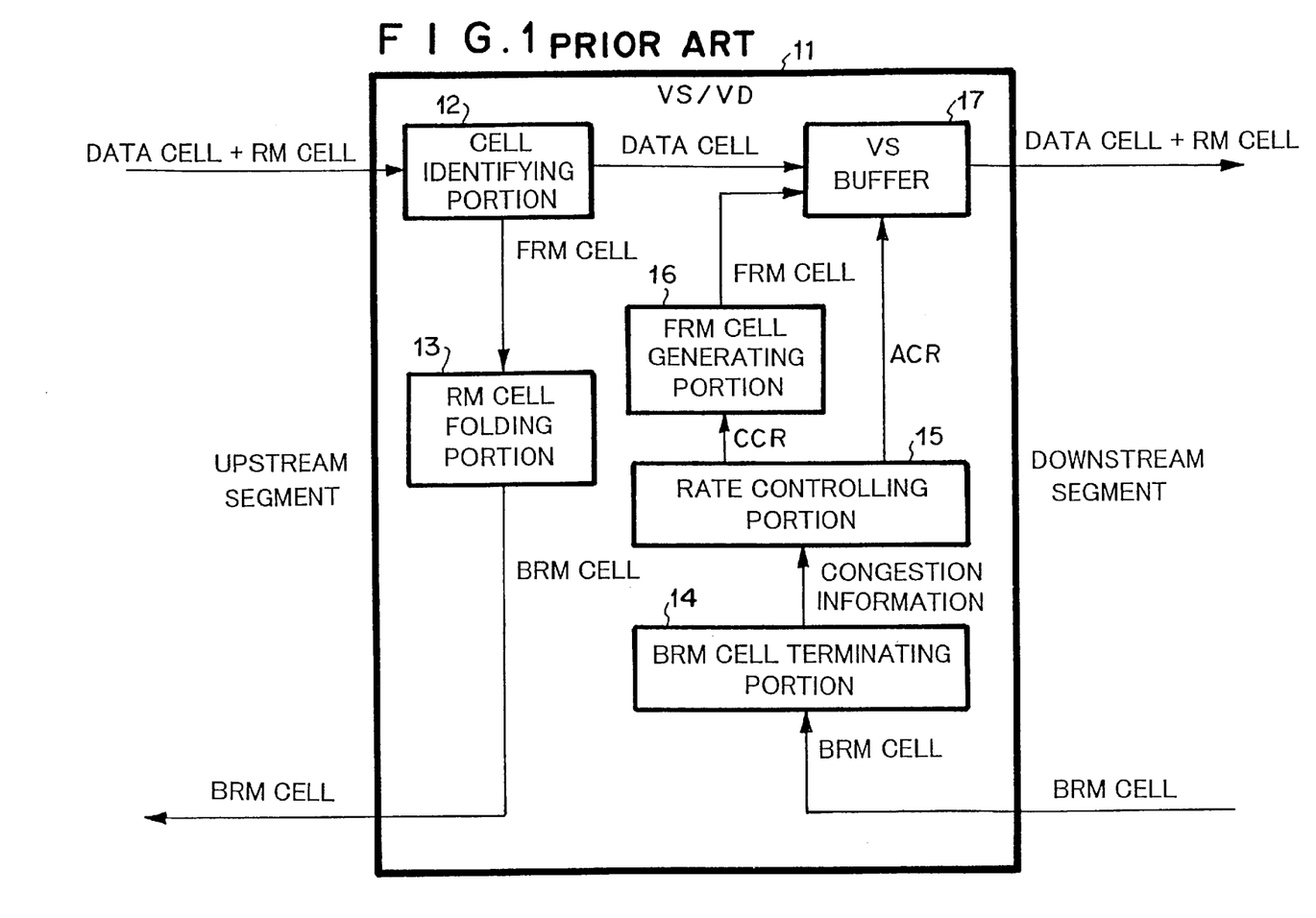
FIG. 1 is a block diagram showing the structure of a conventional VS/VD.

FIG. 1 shows the structure of a VS/VD (Virtual Source/Virtual Destination) 11 disclosed in "ABR with Virtual Source/Virtual Destination for ATM Wide Area Network" (Tsutomu Murano et. al., B-719, 1996 Convention, The Institute of Electronics, Information and communication Engineers, Japan, Aug. 30, 1996) (referred to as Paper [1]).

Figure 2:
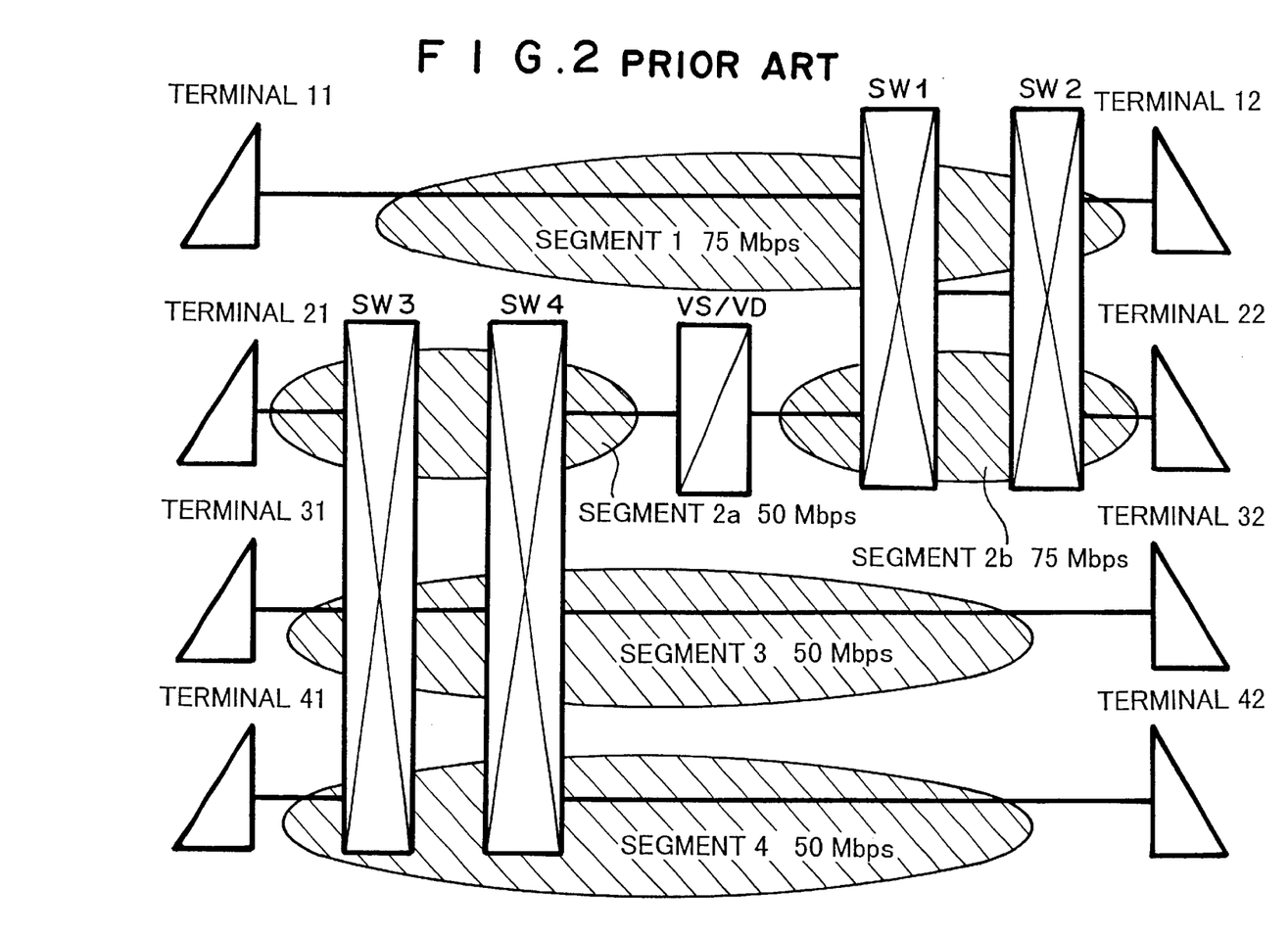
FIG. 2 is a schematic diagram showing an assignment of a network resource to each segment in the case that the conventional VS/VD shown in FIG. 2 is used.

Assuming that a network shown in FIG. 2 has been structured, the operation of the VS/VD will be described. In FIG. 2, solid lines represent links (transmission lines). SW1, SW2, SW3, and SW4 represent switches (exchanges). The switches SW1 and SW2 are connected with one link. Likewise, the switches SW3 and SW4 are connected with one link. A terminal 11 is connected to a terminal 12 through the switches SW1 and SW2. A terminal 31 is connected to a terminal 32 through the switches SW3 and SW4. A terminal 41 is connected to a terminal 42 through the switches SW3 and SW4. A terminal 21 is connected to a terminal 22 through the switches SW3, SW4, SW1, and SW2.

An area between the terminals 11 and 12 is referred to as segment 1. An area between the terminals 21 and 22 is referred to as segment 2. An area between the terminals 31 and 32 is referred to as segment 3. An area between the terminals 41 and 42 is referred to as segment 4. In each segment, congestion information of a downstream area is fed back and thereby a transmission rate of an upstream area is decided. Since the segment 2 includes the four switches SW3, SW4, SW1, and SW2, the feedback loop becomes long. Thus, the feedback control becomes difficult.

To solve such a problem, the VS/VD is disposed in the middle of the segment 2 so as to divide the segment 2 into segment 2a and 2b. Thus, as with the segments 1, 3, and 4, each of the segments 2a and 2b includes only two switches.

Returning to FIG. 1, the upstream segment and the downstream segment of the VS/VD 11 is the segment 2a and the segment 2b, respectively. The circuit shown in FIG. 1 is divided into an upstream segment circuit portion and a downstream segment circuit portion. In each of the segments 2a and 2b, a transmission bit rate is decided corresponding to the situation of the network.

A data cell and an RM (Resource Management) cell are input from the upstream segment through a relevant transmission line. Each cell is a packet with a fixed bit length (for example, 53×8 bits).

Figure 5A:
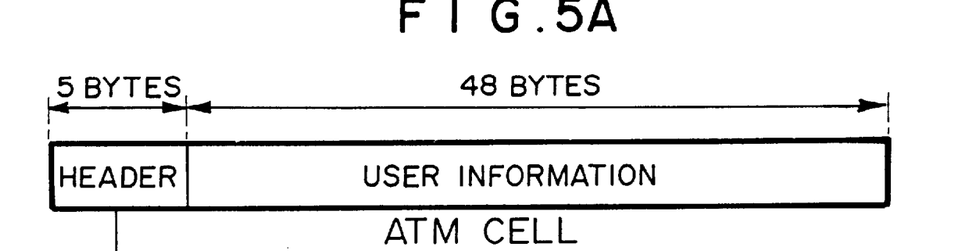
FIGS. 5A, 5B, 5C, and 5D are schematic diagrams for explaining formats of ATM cells.
Figure 5B:
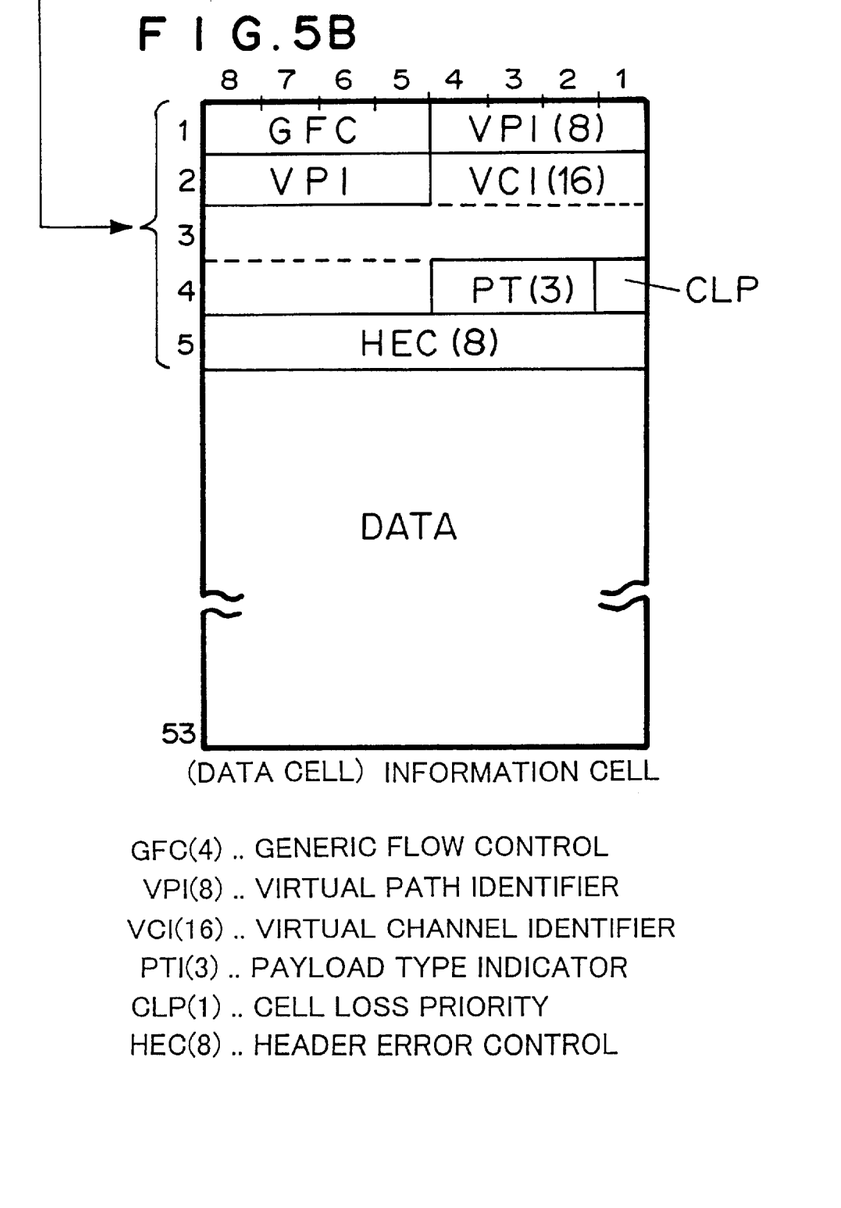
Figure 5C:
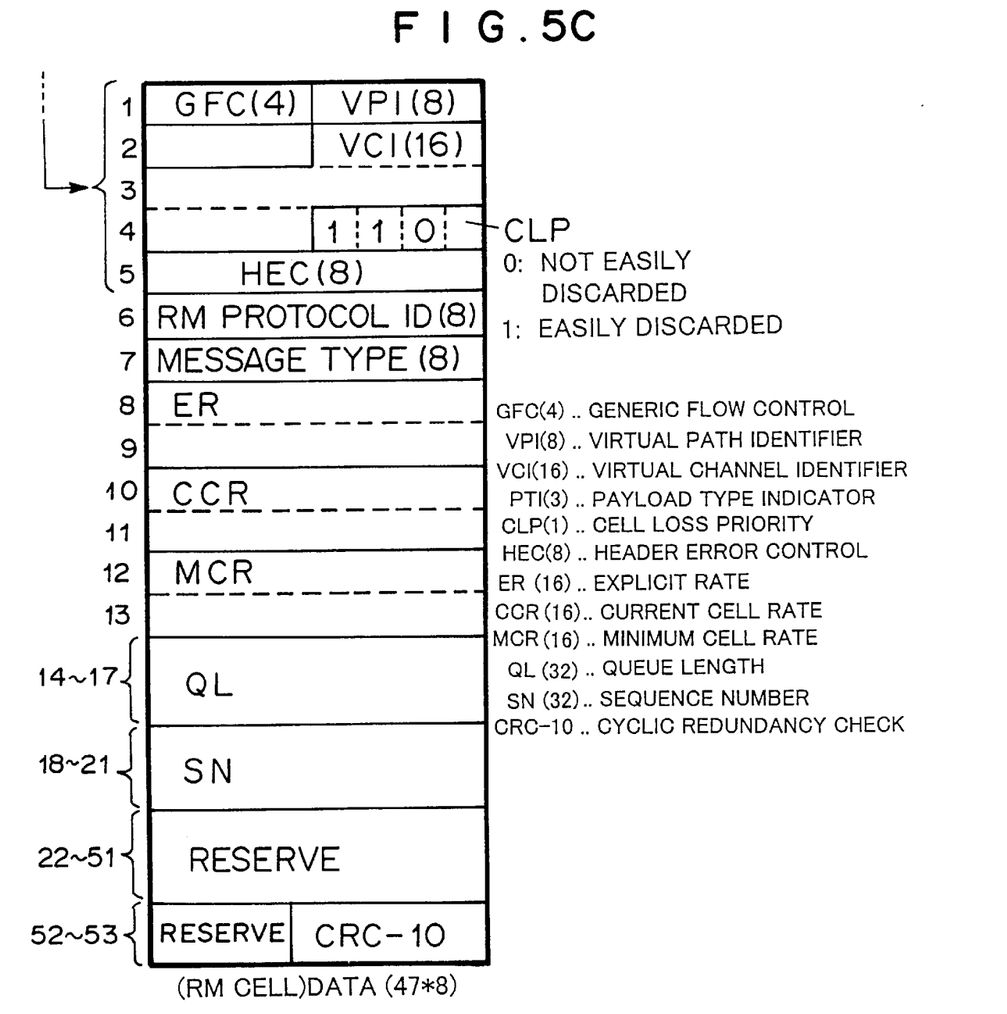
Figure 5D:
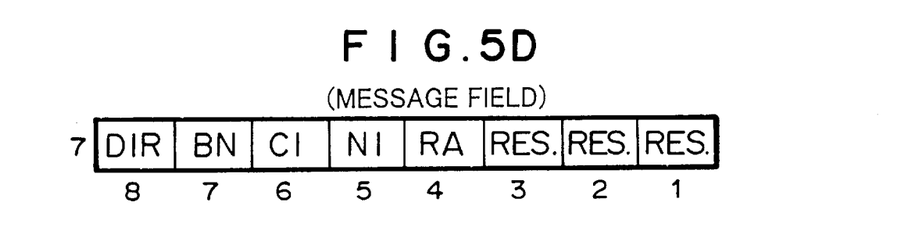

Next, with reference to FIGS. 5A, 5B, 5C, and 5D, ATM cells will be described. In FIGS. 5A, 5B, 5C, and 5D, the ATM cells are categorized as data cells and RM (Resource Management) cells. A data cell is composed of a header portion of five bytes and a user information portion of 48 bytes. An RN cell is used for resource management. The header portion of the data cell is the same as the header portion of the RN cell. FIG. 5C shows the format of the RM cell. As shown in FIGS. 5C and 5D, the RM cell comprises five bytes the header portion, one byte of RM protocol ID for identifying the RM cell, eight bits of a message type field in which contains DIR (direction bit in RM cell which DIR=0 is a forward direction and DIR=1 is backward direction), BN (BECN bit in RM cell), CI(congestion indication bit in RM cell), NI(no increase in RM cell), RA(resource allocation bit in RM cell), and three bits reserves.

The upstream segment circuit portion terminates an FRM (Forward Resource Management) cell corresponding to the destination behavior defined in ATM Forum Traffic Management Specification Version 4.0 (S.S. Satheye, April 1996) and folds back a BRM (Backward Resource Management) cell.

On the other hand, the downstream segment circuit portion terminates a BRM cell corresponding to the source behavior defined in ATM Forum Traffic Management Specification Version 4.0 (S.S. Satheye, April 1996), decides a transmission rate of a data cell to be transmitted to the downstream segment, and generates a new FRM cell.

To absorb the difference between the transmission rate of the upstream segment and the transmission rate of the downstream segment, a VS buffer is disposed in the downstream segment circuit portion.

In other words, the upstream segment circuit portion shown in FIG. 1 has a cell identifying portion 12 and an RM cell folding portion 13. The cell identifying portion 12 identifies a cell received from the upstream segment. The RM cell folding portion 13 folds back an FRM cell as a BRM cell to the upstream segment. At this point, DIR ="1", CI="1" or "0", NI ="1" or "0", and RA ="1" or "0" of a message type field (seventh byte in a RM cell) of the BRM cell shown in FIG. 5D are set. The data cell is temporarily stored in the VS buffer 17 of the downstream segment circuit portion.

The downstream segment circuit portion has a BRM cell terminating portion 14, a rate controlling portion 15, an FRM cell generating portion 16, and the VS buffer 17. The BRM cell terminating portion 14 terminates a BRM cell received from the downstream segment and extracts congestion information (ER, CI, and NI) from the payload of the cell. The rate controlling portion 15 calculates a rate information for ACR (Allowed Cell Rate) corresponding to the congestion information. The rate controlling portion 15 controls the output timing of the VS buffer 17 corresponding to the ACR.

The rate information is placed as CCR (Current Cell Rate) in the payload of an FRM cell generated by the FRM generating portion 16. The resultant cell is transmitted to the downstream segment through the VS buffer 17. At this point, DIR="0" and BN ="0" of the message type field (bit 7) of the FRM cell shown in FIG. 5D are set. Since the VS/VD 11 controls a short feedback loop, when a switch of the VS/VD 11 is designed with a limited buffer amount of the VS buffer 17, the VS/VD 11 can be used for a network system that grows.

In addition, since the VS buffer 17 absorbs temporary congestion due to a statistical fluctuation of the applied load, the switch does not need to control terminals due to the congestion. Thus, the use rate of the network is improved.

However, in the VS/VD disclosed in Paper [1], since the feedback loop is cut by the VS/VD, the following problems take place.

In FIG. 2, it is assumed that the link connecting the switches SW1 and SW2 and the link connecting the SW3 and the SW4 have a transmission capacity of 150 Mbps each. When the transmission capacity of the line connecting the switches SW1 and SW2 is equally divided by the segment 1 and the segment 2b, the transmission capacity of 75 Mbps can be assigned to each segment.

Likewise, when the transmission capacity of the link connecting the switches SW3 and SW4 is equally divided by the segment 2a, the segment 3, and the segment 4, the transmission capacity of 50 Mbps can be assigned to each segment.

Considering the VS/VD disposed between the segment 2a and the segment 2b, even if the transmission capacity of 75 Mbps is assigned to the downstream segment 2b, since cells are input from the upstream segment 2a at 50 Mbps, the transmission capacity of 25 Mbps of 75 Mbps assigned to the segment 2b is not used.

In other words, in the system disclosed in Paper [1], since the allowed cell rate ACR of the downstream segment is decided regardless of that of the upstream segment, if the transmission rate of the upstream segment is lower than the transmission rate of the downstream segment, part of the allowed cell rate ACR assigned to the downstream segment is not used. Thus, from a point of view of the entire network, the use rate deteriorates.

SUMMARY OF THE INVENTION

The present invention is made to solve the above-described problem. An object of the present invention is to provide an ATM system with ABR function for assigning the transmission rate that has a difference in a downstream segment to another segment that shares a line with the downstream segment having a link jointly through a switch so as to improve the use rate of the network.

A first aspect of the present invention is a transmission rate deciding method for an ATM system with ABR function for optimally using a network resource, the ATM system having a VS/VD for switching cells from one of two types of feedback loops to the other (namely, from an upstream segment to a downstream segment), congestion information being transmitted to the two types of feedback loops, the VS/VD having an upstream segment circuit portion and a downstream segment circuit portion, the method comprising the steps of directly informing the downstream segment circuit portion of CCR (Current Cell Rate) information when the upstream segment circuit portion has received an FRM (Forward Resource Management) cell, comparing the CCR information with ER (Explicit Rate) of the BRM (Backward Resource Management) cell received from a downstream segment, updating the ER with the value of the CCR information when the value of the CCR is smaller than the value of the ER, and deciding a transmission rate for the downstream segment corresponding to the updated congestion information.

A second aspect of the present invention is an ATM (Asynchronous Transfer Mode) system with ABR (Available Bit Rate) function for optimally using a network resource, comprising a VS/VD (Virtual Source/Virtual Destination) for switching cells from one of two types of feedback loops to the other (namely, from an upstream segment to a downstream segment), congestion information being transmitted to the feedback loops, the VS/VD having an upstream segment circuit portion and a downstream segment circuit portion, wherein the upstream segment circuit portion comprises a cell identifying portion for detecting an FRM cell (Forward Resource Management) cell received corresponding to destination behavior so as to process the FRM cell, an RM cell folding portion for terminating the FRM cell detected by the cell identifying portion and transmitting a BRM (Backward Resource Management) cell, and a CCR extracting portion for extracting CCR (Current Cell Rate) information from the BRM cell transmitted by the RM cell folding portion, and wherein the downstream segment circuit portion comprises an ER comparing/updating portion for comparing an ER (Explicit Rate) area of the received BRM cell with the CCR information extracted by the CCR extracting portion, updating the ER area of the BRM cell with the smaller value of the ER area and the CCR information, and outputting the updated ER area as a new BRM cell so as to process the BRM cell received corresponding to source behavior, a BRM cell terminating portion for terminating the new BRM cell that has been updated by the ER comparing/updating portion, a rate controlling portion for receiving congestion information from the BRM cell terminating portion and deciding a cell transmission rate corresponding to the received congestion information, an FRM cell generating portion for generating a new FRM cell with the CCR information decided by the rate controlling portion, and a VS buffer for temporarily storing a cell that has been identified as a data cell by the cell identifying portion until the rate controlling portion decides a transmission timing.

The difference between ABR (Available Bit Rate) that can be assigned to the VS/VD and the transmission rate decided by the rate controlling portion is used to improve the transmission rate of another VS/VD that shares a link with the VS/VD through a switch.

The destination behavior and the source behavior are defined in ATM Forum Traffic Management Specification Version 4.0.

The VS buffer has a memory capacity for temporarily absorbing congestion due to a statistical fluctuation of an applied load.

According to the present invention, when the transmission rate of an upstream segment is lower than the allowed cell rate of a downstream segment, since the allowed cell rate of the downstream segment is decreased to the transmission rate of the upstream segment, the remaining transmission rate can be assigned to another segment that shares the link with the downstream segment through a switch. Thus, the resource of the network can be effectively used.

These and other objects, features and advantages of the present invention will become more apparent in light of the following detailed description of a best mode embodiment thereof, as illustrated in the accompanying drawings.

DESCRIPTION OF PREFERRED EMBODIMENT

Next, with reference to the accompanying drawings, an embodiment of the present invention will be described.

Figure 3:
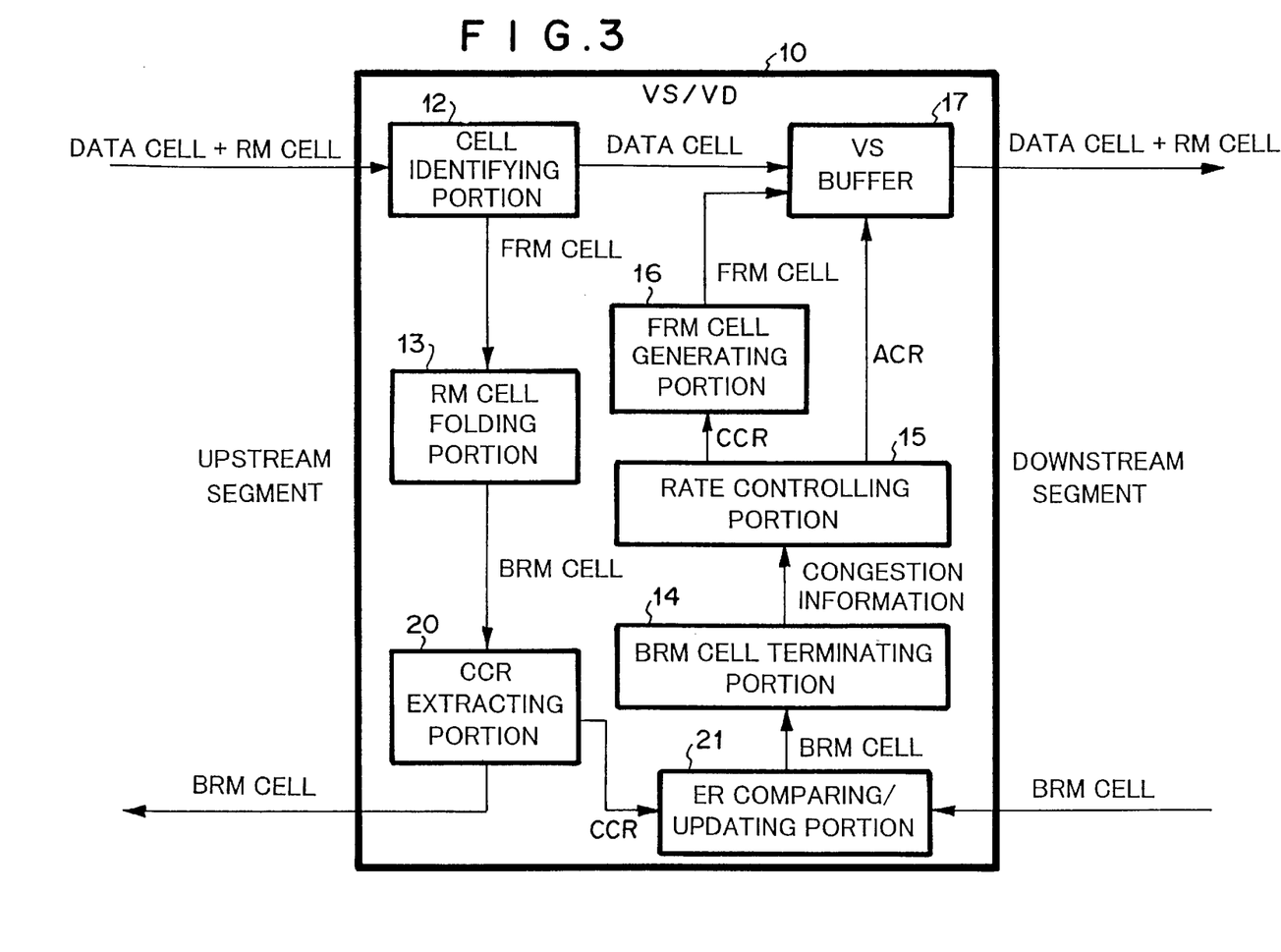
FIG. 3 is a block diagram showing the structure of a VS/VD according to an embodiment of the present invention.

FIG. 3 is a block diagram showing the structure of a VS/VD 10 according to the embodiment of the present invention.

For simplicity, in FIG. 3, similar portions to those in FIG. 1 are denoted by similar reference numerals and their description will be omitted.

As with the circuit shown in FIG. 1, in the circuit shown in FIG. 3, an RM cell folding portion 13 folds back an FRM cell (Forward Resource Management cell) as a BRM cell (Backward Resource Management cell) for an upstream segment. At this point, a CCR extracting portion 20 extracts a CCR (Current Cell Rate) area from the payload of the BRM cell. Hereinafter, the extracted data is referred to as CCR_Up.

An ER (Explicit Rate) comparing/updating portion 21 compares data (ER_Down) in an ER area of a BRM cell received from a downstream cell with the data CCR_Up.

The ER comparing/updating portion 21 updates the ER area with min {CCR_Up, ER_Down} (namely, smaller one of CCR_Up and ER_Down) as the new ER.

Although the operations of a BRM cell terminating portion 14, a rate controlling portion 15, an FRM cell generating portion 16, and a VS buffer 17 of the circuit shown in FIG. 3 are the same as the operations of those of the circuit shown in FIG. 1, the ER of the congestion information (ER, CI (Congestion Indication), NI (No Increase)) of the payload stored in the BRM cell terminating portion 14 is an updated ER. The rate controlling portion 15 decides a transmission rate corresponding to the updated ER.

For example, when $CCR_{Up}$ is 50 Mbps and ER_Down is 75 Mbps, since ER stored in the BRM cell terminating portion 14 is 50 Mbps, the transmission rate decided by the rate controlling portion 15 is 50 Mbps.

Figure 4:
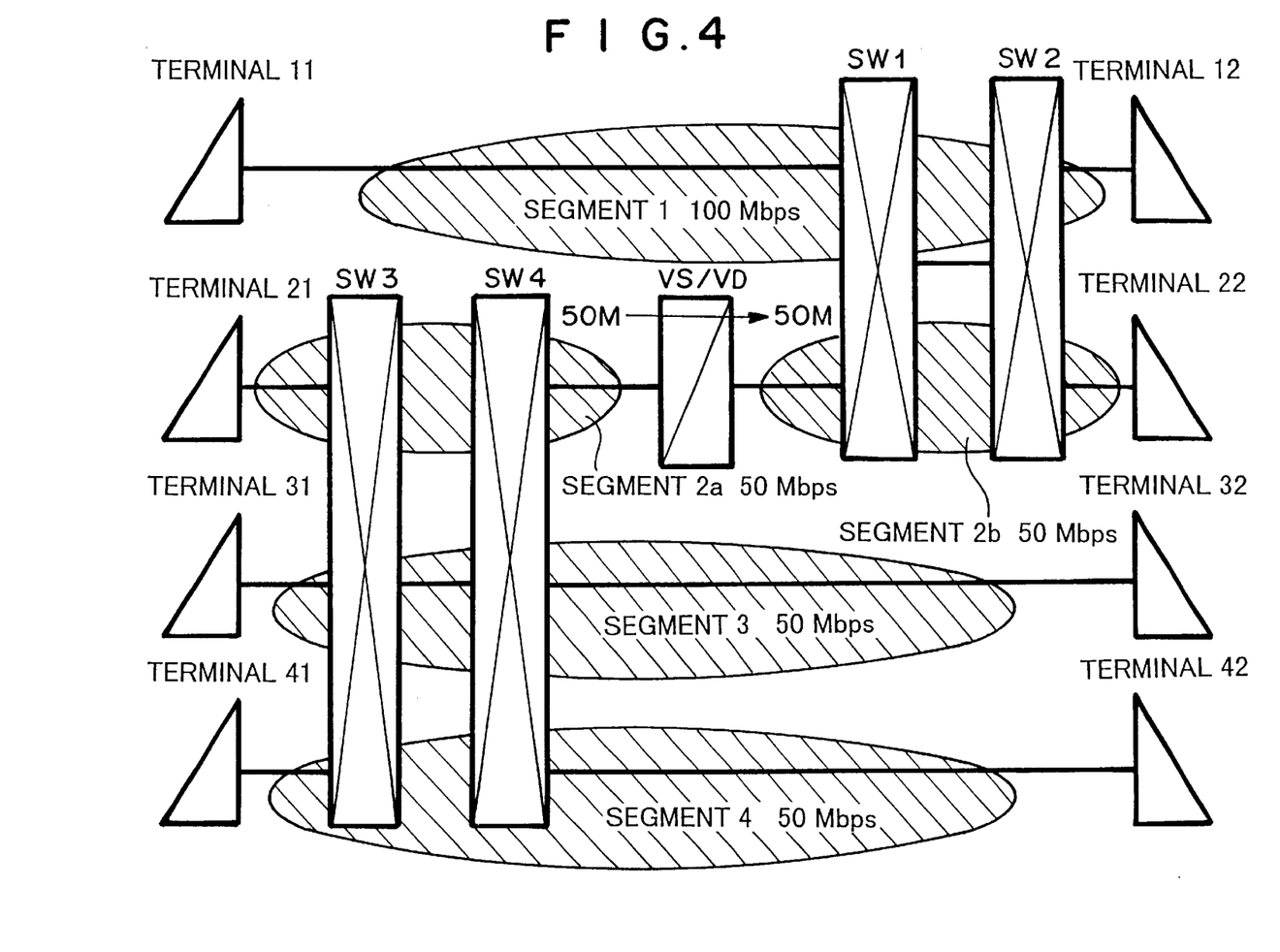
FIG. 4 is a schematic diagram showing an assignment of a network resource to each segment in the case that the VS/VD shown in FIG. 3 is used.

In the conventional circuit shown in FIG. 1, the use rate of the network resource may deteriorate as described with reference to FIG. 2. FIG. 4 is a schematic diagram showing the segment structure that is similar to the segment structure shown in FIG. 2. Next, with reference to FIG. 4, the operation of the present invention will be described. Referring to FIG. 4, in the segment 2a, CCR_Up of the VS/VD is 50 Mbps. CCR_Up is smaller than ER_Down in a BRM cell received from the segment 2b. Thus, ER of the congestion information stored in the BRM cell terminating portion 14 is 50 Mbps. The transmission rate is decided corresponding to 50 Mbps.

On the other hand, since the transmission capacity of the link connecting the switches SW1 and SW2 is 150 Mbps, the segment 1 can be assigned the transmission resource of 100 Mbps (150 Mbps−50 Mbps=100 Mbps).

In the VS/VD according to the present invention, when the transmission rate of an upstream segment is smaller than an allowed cell rate of a downstream segment, the downstream segment is assigned the transmission rate of the upstream segment. The remaining transmission capacity is assigned to another segment that shares a link with the downstream segment through a switch. Thus, the network can be operated without deterioration of the use rate.

Although the present invention has been shown and described with respect to a best mode embodiment thereof, it should be understood by those skilled in the art that the foregoing and various other changes, omissions, and additions in the form and detail thereof may be made therein without departing f from the spirit and scope of the present invention.

What is claimed is:

1. An ATM (Asynchronous Transfer Mode) system with ABR (Available Bit Rate) function for optimally using a network resource, comprising:
    a VS/VD (Virtual Source/Virtual Destination) for switching cells from one of two types of feedback loops to the other, congestion information being transmitted to the feedback loops, said VS/VD having an upstream segment circuit portion and a downstream segment circuit portion,
    wherein the upstream-segment circuit portion comprises:
        a cell identifying portion for detecting an FRM (Forward Resource Management) cell received corresponding to destination behavior so as to process the FRM cell;
        an RM (Resource Management) cell folding portion for terminating the FRM cell detected by said cell identifying portion and transmitting a BRM (Backward Resource Management) cell; and
        a CCR extracting portion for extracting CCR (Current Cell Rate) information from the BRM cell transmitted by said RM cell folding portion, and
    wherein the downstream segment circuit portion comprises:
        an ER comparing/updating portion for comparing an ER (Explicit Rate) area of a BRM cell received from a downstream cell with the CCR information extracted by said CCR extracting portion, updating the ER area of the received BRM cell with a smaller value of the ER area and the CCR information, and outputting the updated ER area as a new BRM cell so as to process the received BRM cell corresponding to source behavior;
        a BRM cell terminating portion for terminating the new BRM cell that has been updated by said ER comparing/updating portion;
        a rate controlling portion for receiving congestion information from said BRM cell terminating portion and deciding a cell transmission rate corresponding to the received congestion information;
        an FRM cell generating portion for generating a new FRM cell with the CCR information decided by said rate controlling portion; and
        a VS buffer for temporarily storing a cell that has been identified as a data cell by said cell identifying portion until said rate controlling portion decides a transmission timing.

2. The ATM system as set forth in claim 1, wherein the difference between ABR (Available Bit Rate) that can be assigned to said VS/VD and the transmission rate decided by said rate controlling portion is used to improve the transmission rate of another VS/VD that shares a link with said VS/VD through a switch.

3. The ATM system as set forth in claim 1,
    wherein the destination behavior and the source behavior are defined in ATM Forum Traffic Management Specification Version 4.0.

4. The ATM system as set forth in claim 1,
    wherein said VS buffer has a memory capacity for temporarily absorbing congestion due to a statistical fluctuation of an applied load.

5. The ATM system as set forth in claim 2,
    wherein the destination behavior and the source behavior are defined in ATM Forum Traffic Management Specification Version 4.0.

6. The ATM system as set forth in claim 2, wherein said VS buffer has a memory capacity for temporarily absorbing congestion due to a statistical fluctuation of an applied load.

7. The ATM system as set forth in claim 3, wherein said VS buffer has a memory capacity for temporarily absorbing congestion due to a statistical fluctuation of an applied load.

8. The ATM system as set forth in claim 1, wherein said one of two types of feedback loops are an upstream segment to a downstream segment.

9. A transmission rate deciding method for an ATM (Asynchronous Transfer Mode) system with ABR (Available Bit Rate) function for optimally using a network resource, the ATM system having a VS/VD (Virtual Source/ Virtual Destination) for switching cells from one of two types of feedback loops to the other, congestion information being transmitted to the two types of feedback loops, the VS/IV having an upstream segment circuit portion and a downstream segment circuit portion, the method comprising the steps of:

directly informing the downstream segment circuit portion of CCR (Current Cell Rate) information when the upstream segment circuit portion has received an FRM (Forward Resource Management) cell;

comparing the CCR information with ER (Explicit Rate) of a BRM (Backward Resource Management) cell received from a downstream segment;

updating the ER with the value of the CCR information when the value of the CCR is smaller than the value of the ER for updated congestion information; and deciding a transmission rate for the downstream segment.

corresponding to the updated congestion information.

10. The transmission rate deciding method as set forth in claim 9, wherein the difference between ABR (Available Bit Rate) which can be assigned to the VS/VD and the transmission rate decided for the downstream segment is used to improve the transmission rate of another VS/VD that shares a link with the VS/VD through a switch.

11. The transmission rate deciding method as set forth in claim 9, wherein the transmission rate after said deciding step is transmitted as the ER to downstream segment.

12. The transmission rate deciding method as set forth in claim 9, wherein said one of two types of feedback loops are an upstream segment to a downstream segment.

* * * * *